United States Patent Office 3,480,427
Patented Nov. 25, 1969

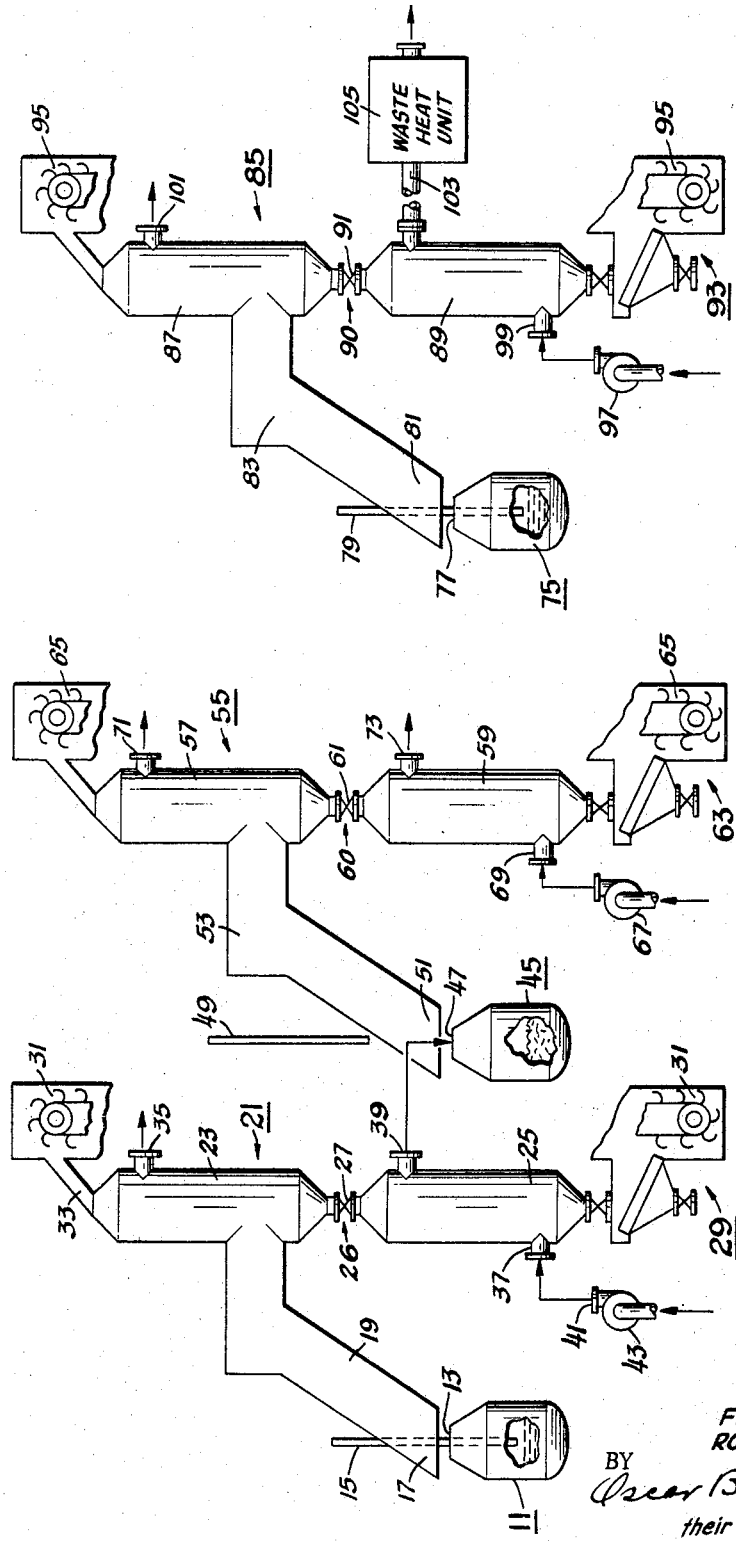

3,480,427
METHOD AND APPARATUS FOR TREATING METALLURGICAL FURNACE GASES
Fred Denig, Kilchberg, Zurich, Switzerland, and Robert E. Powers, Pittsburgh, Pa., assignors to Koppers Company, Inc., a corporation of Delaware
Continuation of application Ser. No. 375,912, June 17, 1964. This application July 26, 1967, Ser. No. 656,294
Int. Cl. C21b 1/02; F27d 17/00
U.S. Cl. 75—43           2 Claims

ABSTRACT OF THE DISCLOSURE

Oxygen-bearing gases are mixed with CO-bearing gases in a zone outside of a BOF converter where the CO is oxidized to $CO_2$. The liberated heat of oxidation is given up to a heat retentive medium in a pebble heater. Cold air passing through the pebble heater absorbs heat and the heated air is directed onto cold scrap in a second BOF converter to preheat the scrap, which is subsequently melted and refined. The CO containing off gases from the second BOF are burned and the heat thereof recovered in a second pebble heater. Cold gas is heated in the second pebble heater and utilized to preheat scrap in the first BOF converter.

CROSS REFERENCE TO RELATED APPLICATION

This application is a continuation of application Ser. No. 375,912 filed June 17, 1964 and now abandoned.

This invention relates to method and apparatus for treating and utilizing the heat from gases issuing from a metallurgical furnace and, more particularly, from a basic oxygen furnace.

This application is an improvement in the system of an application entitled "Method and Apparatus for Treating Gases," Ser. No. 321,561, filed Nov. 5, 1963 by Fred Denig, now Patent 3,271,130. This application provides a method and apparatus to treat the off-gases discharged by a metallurgical furnace to utilize such gases, for example, to preheat scrap metal in a metallurgical furnace, and to utilize the potential combustion energy of the gases as well as the sensible heat thereof.

In the operation of a metallurgical furnace, such as a basic oxygen furnace, scrap metal is charged into the basic oxygen furnace or converter, and hot metal is added. An oxygen lance is then lowered into the furnace, the oxygen is turned on and then burnt lime is charged into the vessel. Reactions within the furnace occur almost immediately, producing a large quantity of gas. The off-gases issuing from the furnace contain a great deal of dust or fine particulate matter, and it has been the practice heretofore to divert the furnace off-gases into a gas cleaning system. Some attempts have been made to treat and utilize the furnace off-gases in various ways, but no method has proved to be entirely satisfactory.

This invention utilizes the sensible heat of the off-gases from the furnace in a practical application, and, in addition, contemplates oxidizing the carbon monoxide content of the furnace off-gases and combining the heat of combustion with the sensible heat of the gases for a useful purpose.

In the present invention, oxygen bearing gases are mixed with gases from a metallurgical furnace which contain carbon monoxide to burn the carbon monoxide and to heat further the gases, and the heat from the gases is applied to a quantity of scrap metal disposed in a metallurgical furnace to preheat such scrap metal. In another aspect of the present invention the heat from the gases is stored and later liberated and utilized.

For a further understanding of the present invention and for advantages and features thereof, reference may be made to the following description taken in conjunction with the accompanying drawings forming a part of this application in which:

FIG. 1 is a schematic arrangement of one form of apparatus which may be used to carry out the principles of the present invention, in one aspect thereof; and FIG. 2 is a schematic arrangement of another form of apparatus which may be used to carry out the principles of the present invention in another aspect thereof.

Referring now to the drawings, FIG. 1 illustrates a typical basic oxygen furnace or converter 11, having a mouth 13, and a typical oxygen lance 15, which may be introduced into and removed from the furnace 11 via the mouth 13 in the usual manner. Above the furnace mouth, there is disposed an off-gas hood structure 17 which may be mounted in spaced relation to the furnace mouth 13, about as shown. The off-gas hood structure 17 is joined to a furnace off-gas conduit 19, which, in turn, may be connected to the inlet port of a heat absorptive apparatus, one such type of apparatus being a conventional pebble heater apparatus 21. The pebble heater apparatus comprises an upper pebble heating chamber 23 and a lower heat transfer chamber 25. The upper and lower chambers 23, 25 respectively, are interconnected via a throat structure 26, wherein there is a pebble flow control mechanism 27. The pebble heater apparatus 21 is also provided with a conventional variable feeder apparatus 29, located beneath the lower heat transfer chamber 25, and with a bucket type elevator mechanism 31 which is used to lift the pebble heating material and reload it into the upper chamber 23, via a suitable pebble flow conduit 33. The upper pebble heating chamber 23 has a gas flow outlet conduit 35, while the lower heat transfer chamber 25 has both a gas inlet conduit 37 and a gas outlet conduit 39. The gas inlet conduit 37 may be suitably connected to the discharge outlet 41 of a rotary type air blower 43 for a purpose that will be described hereinafter.

The apparatus which has been described hereinbefore is similarly duplicated in another adjacently disposed apparatus comprising: a basic oxygen furnace or converter 45, having a mouth 47; an oxygen lance 49; an off-gas hood structure 51; a furnace off-gas conduit 53; a pebble heater aparatus 55, including an upper pebble heating chamber 57 and a lower heat transfer chamber 59, with a throat structure 60 disposed therebetween and wherein there is a pebble flow control mechanism 61; a variable pebble feeder apparatus 63; and a pebble elevator mechanism 65. It is convenient to establish the second apparatus adjacent and near to the first apparatus for a purpose to be described hereinafter. A similar air inlet blower 67 may be connected to a gas inlet conduit 69 that is attached to the pebble heater apparatus 55, about as shown in FIG. 1. Additionally, gas outlet conduits 71 and 73 are provided in the upper and lower chambers 57, 59 respectively.

Referring again to the drawings, FIG. 2 illustrates apparatus which may be used to practice the present invention in another aspect thereof. The apparatus of FIG. 2 is similar to one portion of the apparatus described in connection with FIG. 1, and comprises: a basic oxygen furnace or converter 75, having a mouth 77; an oxygen lance 79; an off-gas hood structure 81; a furnace off-gas conduit 83; a pebble heater apparatus 85, including an upper pebble heating chamber 87 and a lower heat transfer chamber 89, with a throat structure 90 disposed therebetween and wherein there is a pebble flow control mechanism 91; a variable pebble feeder apparatus 93; and a pebble elevator mechanism 95. There is also provided a similar air inlet blower 97, which may be suitably connected to a gas inlet conduit 99 that is attached to the pebble heater apparatus 85; and also gas outlet conduits 101, 103 in the upper and lower chambers 87, 89 respectively. In this aspect of the present invention, a conventional type of steam generator or waste heat boiler 105 may be connected to the gas outlet conduit 103.

Now, to understand the principles of the present invention, reference may be made initially to FIG. 1. It was mentioned hereinbefore that steel is made in a basic oxygen furnace, such as 11, 45, by charging scrap metal and hot metal through the mouth 13 of the furnace 11, and thereafter lowering the oxygen lance 15 to the proximity of the charge material. Subsequently, oxygen is introduced into the furnace via the lance, and, at the same time, burnt lime is charged into the vessel. Reactions occur almost immediately in the furnace between the oxygen and the hot metal. Consequently, a large quantity of furnace off-gas containing carbon monoxide (CO) is formed in the furnace. As soon as this carbon monoxide containing off-gas issues from the mouth 13 of the furnace, it reacts with the atmosphere and burns. The products of combustion formed in the hood 17 are heated and may then be conducted via the furnace off-gas conduit 19 to the upper chamber 23 of the pebble heater apparatus 21. The material in the pebble heater apparatus absorbs and holds the heat from the off-gas which is consequently cooled. In due course, after the oxygen blow period is over and the reaction ceases, the pebble flow control mechanism 27 may be manipulated or otherwise activated so as to permit the pebble materials to pass via the throat structure 26 from the upper chamber 23 to the lower chamber 25. Thereupon, the flow control mechanism 27 is closed and air may be introduced into the lower heat transfer chamber 25 by actuating the air blower 43, which is conveniently connected to the gas inlet conduit 37. As the air passes through the lower chamber and over the heated pebble material, and emerges via the air outlet conduit 39, it absorbs heat from the pebble material. The heated air may be then conveyed, via a suitable conduit means (not shown), to the interior of the adjacent basic oxygen furnace or converter 45 which has been previously charged with scrap metal in preparation for a melt of steel. The heated air impinges against the scrap metal and preheats it. It will be appreciated by those skilled in the art that it is not desirable to discharge the stored heat too suddenly. It is preferably to control the rate of discharge of the heated air from the lower heat transfer chamber, and this may, of course, be readily accomplished by regulating and controlling the air output of the blower 43.

After the scrap metal in the basic oxygen furnace or converter 45 has been heated in the foregoing manner, hot metal may be introduced in the normal manner, the oxygen lance 49 may be lowered into the furnace 45, and the melting process carried out in the manner described hereinbefore. In the meantime, the steel in the basic oxygen furnace or converter 11 may be teemed and the converter may then be charged with another load of scrap mteal and other materials for an additional melt. The heated air which issues from the air outlet conduit 73, may then be directed into the furnace 11 to preheat the scrap metal therein for the same purpose as previously described.

It will be apparent then that the method of the present invention may be practiced in a cyclical manner, and may be readily carried out in association with two or more basic oxygen furnaces or converters. However, the method of the present invention is not limited strictly to the basic oxygen type of furnace, and the method may be used with other types of furnaces, if preferred, with equivalent effectiveness.

It will be understood that the cooled furnace off-gases, which leave the upper pebble heating chamber 23, may be conducted therefrom by suitable conduit means to any conventional type of gas cleaner apparatus, or other suitable apparatus.

To further understand the principles of the present invention, reference may be made to FIG. 2. In this application, the basic oxygen furnace or converter 75 is charged with both scrap and hot metal via the mouth 77, and the oxygen lance 79 is lowered to the proximity of the charged material, as described hereinbefore. The carbon monoxide bearing off-gases, which originate in the furnace as soon as the oxygen is introduced therein, react with the air at the mouth and burn as described hereinbfeore. The heated products of combustion may be conducted to the pebble heater apparatus 85 as before, but, in this application, the air which is heated within the lower heat transfer chamber 89 is conducted to a conventional type of steam generator or waste heat boiler apparatus 105. It was mentioned previously that the rate of heat discharge from the lower heat transfer chamber 89 may be effectively controlled by the rate at which air is conveyed through the chamber 89. And so, it is apparent that, in this application too, the rate at which heat is delivered to the waste heat boiler apparatus 105 may be effectively controlled by regulating the output of the air blower 97.

Thus, it will be apparent from the foregoing that a feature of the present invention is that combustion of the carbon monoxide gas in the hood structure produces sufficient heat to raise the temperature of the scrap metal in the furnace 45 to a temperature of about 1500° F. With an apparatus such as is shown in FIG. 1, for example, the total heat available as sensible heat and heat of combustion of the carbon monoxide (CO) may be about 880,000 B.t.u. per ton of hot metal, or 710,000 B.t.u. per tone of ingots. Assuming that seventy percent of this heat may be recoverable in the overall operation of the pebble heater, a quantity of 500,000 B.t.u. per ton of ingots may therefore be available as a gas, having a temperature of about 2,300° F. This temperature is selected as appropriate for the preheating of scrap where it is desired not to preheat the scrap above 1500° F. in order to avoid oxidation. The gas at this temperature may be applied for useful work either to preheat scrap metal by means of an apparatus such as is shown in FIG. 1, or to generate steam using a steam generator or waste heat boiler apparatus, in the manner shown in FIG. 2.

Another feature of the present invention is that the heat released to the waste heat boiler may be controlled in such a manner that a sudden surge of a large amount of heat is avoided. Heretofore when a waste heat boiler had been operated by the furnace off-gases, the boiler could be operated only during the oxygen blow period, and steam was thus only generated during this sudden surge of heat. It had been necessary, therefore, to provide large expensive steam accumulators in order to store and later release a reasonably uniform flow of steam for useful purposes.

The present invention overcomes the foregoing difficulty in that the quantity of heat available for making steam can be kept at a desired level for uniform heat release purposes. Thus, large steam accumulators are not necessary in the practice of the present invention. The apparatus shown in FIG. 1 has the novel advantage of permitting the heat to be removed from the pebble material in the lower chamber at approximately the same time heat is being stored in the pebble material in the upper chamber. In this manner, a more uniform, steady flow of heat is available. In some applications, where only a single basic oxygen furnace or converter is used, the heat may be stored in the pebble material and later removed, after the single furnace has been recharged with scrap and other material in preparation for another melt.

Another feature of the present invention is that the reaction of the carbon monoxide bearing gases and the oxygen bearing gases produces sufficient heat at high temperature that the scrap metal in an adjacent furnace may be preheated to a temperature approximating 1500° F.

Thus, the efficiency of a melt of steel preheated in this manner is increased.

What is claimed is:

1. Apparatus for treating the off-gases issuing from basic oxygen furnaces including carbon monoxide gas comprising:
   (a) first means for mixing oxygen bearing gases with carbon monoxide bearing first gases in a first zone adjacent to, but outside of a first furnace thereby creating first heated products of combustion;
   (b) a first pebble heater containing a first medium capable of absorbing heat;
   (c) first means conducting said first heated products of combustion into contact with said first medium whereby said first medium is heated;
   (d) means for passing a first gas into contact with said first medium whereby said gas is heated;
   (e) a second basic oxygen furnace wherein scrap metal is disposed;
   (f) means conducting the heated first gas into said second furnace to preheat said scrap metal;
   (g) means for melting the preheated scrap metal in said second furnace and creating carbon monoxide bearing second gases therein;
   (h) second means for mixing oxygen bearing gases with said carbon monoxide bearing second gases in a second zone adjacent to, but outside of said second furnace thereby creating second heated products of combustion;
   (i) a second pebble heater containing a second medium capable of absorbing heat;
   (j) second means conducting said second heated products of combustion into contact with said second medium whereby said second medium is heated;
   (k) means for passing a second gas into contact with the heated second medium whereby said second gas is heated; and
   (l) means conducting the heated second gas into another one of said basic oxygen furnaces to preheat scrap metal disposed therein.

2. A method for treating the off-gases from a pair of basic oxygen furnaces wherein the melting of scrap metal and other ingredients in each furnace produces molten metal and carbon monoxide bearing off-gases comprising:
   (a) mixing oxygen bearing gases with the carbon monoxide bearing off-gases produced by a first one of said pair of furnaces in a zone adjacent to, but outside of said first furnace whereby the carbon monoxide burns and creates first heated products of combustion;
   (b) conducting the first heated products of combustion to a first pebble heater containing a first heat absorptive medium that becomes heated;
   (c) passing a first gas through said first pebble heater whereby said first gas absorbs heat from said medium;
   (d) directing said heated first gas into the second one of said pair of basic oxygen furnaces to preheat scrap metal disposed therein;
   (e) melting the preheated scrap metal in said second basic oxygen furnace and creating second carbon monoxide bearing gases;
   (f) mixing oxygen bearing gases with said second carbon monoxide bearing gases in a zone adjacent to, but outside of said second furnace to burn said second carbon monoxide and create second heated products of combustion;
   (g) conducting said second heated products of combustion into a second pebble heater containing a second medium that becomes heated;
   (h) passing a second gas through said second pebble heater whereby said second gas absorbs heat from said medium;
   (i) discharging the molten metal from said first furnace and recharging said first furnace with scrap metal;
   (j) directing the second heated gas into said first furnace to preheat the scrap metal therein; and
   (k) carrying out the aforementioned steps in a cyclical manner.

References Cited

UNITED STATES PATENTS

| | | | |
|---|---|---|---|
| 2,811,435 | 10/1957 | Bannister et al. | 75—41 |
| 2,831,762 | 4/1958 | Kemmetmuller et al. | 75—60 |
| 2,859,954 | 11/1958 | Grey | 75—41 |
| 2,958,597 | 11/1960 | Churcher | 75—60 X |
| 2,993,781 | 7/1961 | Kerlie | 75—60 X |
| 3,060,014 | 10/1962 | Aihara | 75—43 |
| 3,165,302 | 1/1965 | Krouse | 75—41 X |
| 3,170,017 | 2/1965 | Namy | 75—60 X |
| 3,194,650 | 7/1965 | Kurzinski | 75—60 X |
| 3,222,045 | 12/1965 | Spetzler | 75—60 X |
| 3,271,130 | 9/1966 | Denig | 75—60 |
| 3,231,369 | 1/1966 | Gorlich | 75—60 |
| 3,301,664 | 1/1967 | Hall | 75—43 X |

L. DEWAYNE RUTLEDGE, Primary Examiner

H. W. TARRING II, Assistant Examiner

U.S. Cl. X.R.

75—25, 60; 266—15, 18